United States Patent [19]
Manoogian et al.

[11] 3,915,195
[45] Oct. 28, 1975

[54] SINGLE HANDLE WATER FAUCET

[75] Inventors: Alex Manoogian, Grosse Pointe Farms; Eric V. Pullen, Southfield, both of Mich.

[73] Assignee: Masco Corporation of Indiana, Taylor, Mich.

[22] Filed: May 17, 1974

[21] Appl. No.: 471,038

[52] U.S. Cl.............................. 137/625.41; 251/285
[51] Int. Cl.² ........................................ F16K 11/087
[58] Field of Search .... 251/285; 137/625.41, 636.2, 137/636.3

[56] References Cited
UNITED STATES PATENTS

| | | | |
|---|---|---|---|
| 1,299,586 | 4/1919 | Leibing....................... | 137/625.41 X |
| 3,056,418 | 10/1962 | Adams et al................ | 137/625 H X |
| 3,628,570 | 12/1971 | Andis............................ | 137/625.23 |
| 3,813,080 | 5/1974 | Rogers.............................. | 251/285 |
| 3,823,742 | 7/1974 | Von Corpon..................... | 137/636.3 |

FOREIGN PATENTS OR APPLICATIONS

| | | | |
|---|---|---|---|
| 1,014,342 | 11/1952 | France.......................... | 137/625.41 |

*Primary Examiner*—Henry T. Klinksiek
*Attorney, Agent, or Firm*—E. Dennis O'Connor

[57] ABSTRACT

A single handle hot and cold water mixing and flow control faucet. The faucet includes a handle movement control template having an opening therein through which the faucet operating handle extends. The shape of the template opening permits handle movement from the "off" position to the "full cold" position and thence to the "full hot" position. The template prevents direct movement of the operating handle from the "off" position to a "hot water only" position. Additionally, the faucet includes adjustable stop means to adjustably limit the possible percentage of hot water in the total water flow through the faucet.

4 Claims, 7 Drawing Figures

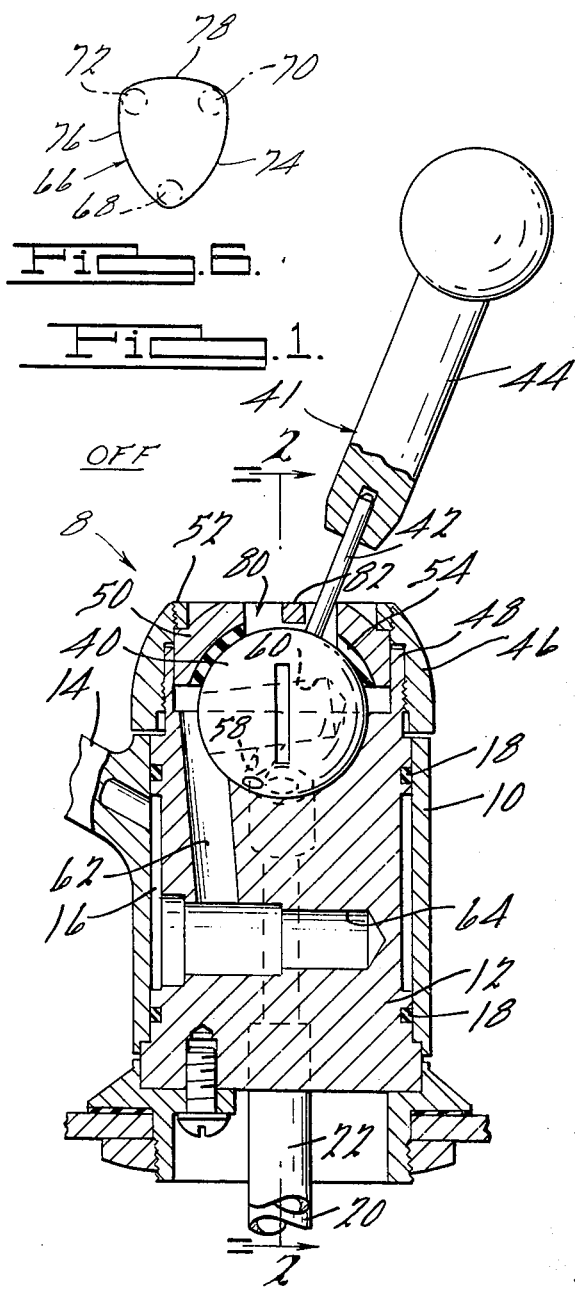
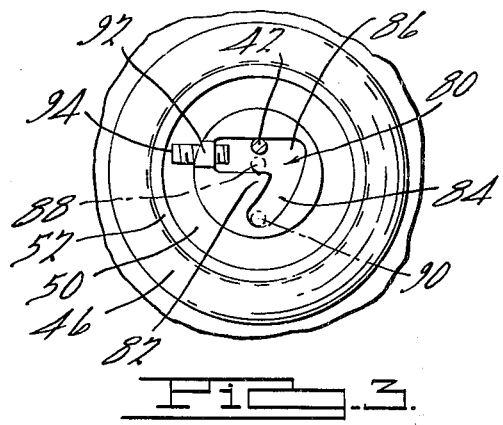
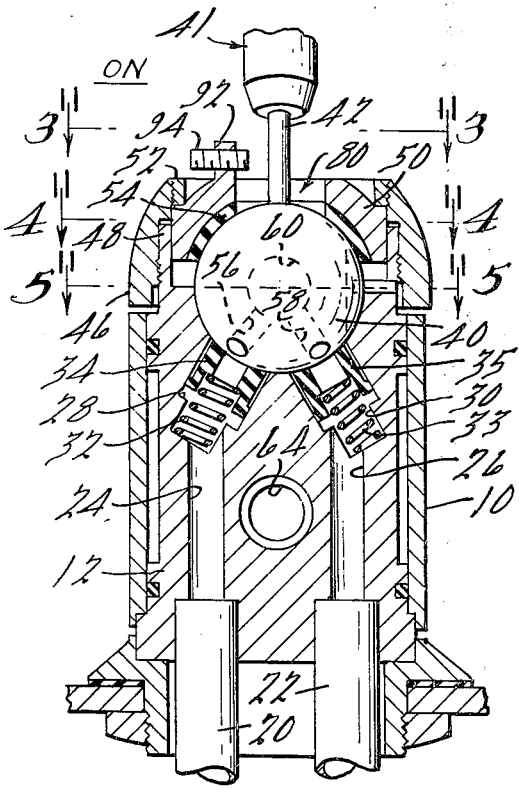
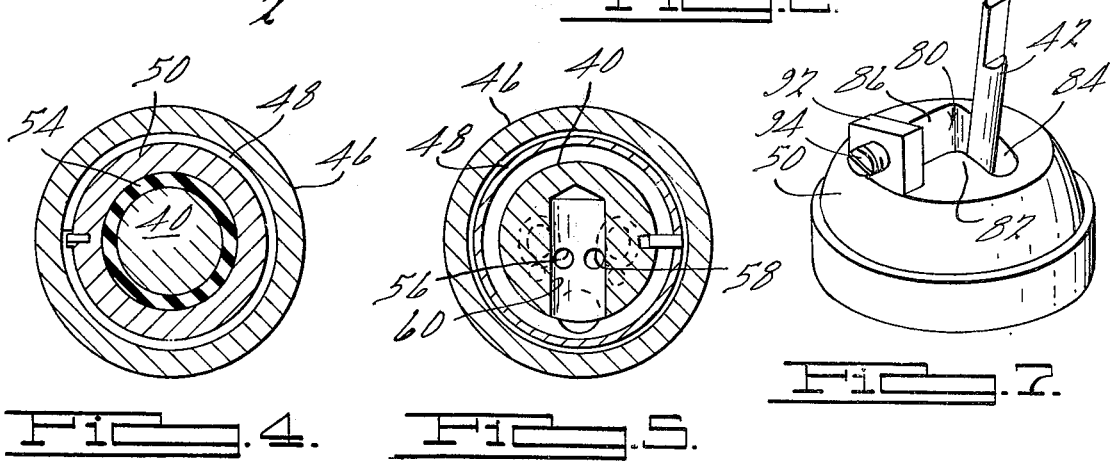

SINGLE HANDLE WATER FAUCET

BACKGROUND OF THE INVENTION

Single handle faucets for the control of both hot and cold water have gained wide acceptance in the construction industry as well as with the consuming public. The advantages of such faucets are many and include the ability for mixing or blending hot and cold water from separate sources or selectively allowing flow of only hot or cold water by manipulation of a single operating handle. A well known type of single handle faucet provides for limited universal movement of the operating handle because of a ball and socket arrangement or other mechanical relationship between the faucet valve member and cooperating valve seat. An example of this type of single handle faucet is disclosed by U.S. Pat. No. 3,056,418, issued Oct. 2, 1962.

Single handle faucets of the type described by this patent provide for handle movement among an infinite number of positions including an "off" position wherein no water passes through the faucet valve and "hot water only-maximum flow" and "cold water only-maximum flow" positions, all of which positions are mutually spaced apart. Recently, certain parties concerned with plumbing aspects of the construction industry have concluded that it is desirable, and in some cases necessary, that hot and cold water single handle faucet valves be incapable of being manipulated so that the operating handle moves from the off position directly to a position whereat only liquid from the hot water source passes through the faucet valve. Additionally, it has been urged that faucets of this type be adjustable so that the hot water portion of total flow volume selectively can be limited in response to various hot water temperatures that may be provided by different hot water sources. In fact, in at least one instance, such requirements for single handle faucets have been included in governmental building code requirements.

It is, therefore, an object of this invention to provide a single handle faucet of the type disclosed in U.S. Pat. No. 3,056,418, that is incapable of being varied directly from an "off" condition to a condition wherein only hot water is supplied. In particular the operating handle of the faucet of this invention can be moved from the off position to a hot water only position only by first passing through a high volume cold water only position. Another object of this invention is the provision of a single handle faucet that is adjustable to limit the possible percentage of hot water in the total water flow to compensate for variances in the temperature of hot water supplied from hot water sources.

SUMMARY OF THE INVENTION

A single handle hot and cold water mixing and flow control faucet constructed in accordance with this invention is adapted to interconnect sources of hot and cold water and water outlet means such as a spigot. The faucet includes a manually movable operating handle swingable in a valve body among an infinity of positions, including an off position, a hot water only position and a cold water only position, to vary the proportions and volumes of hot and cold water passing through the faucet. The locus of possible handle positions is generally triangular with the off position, hot water only position and cold water only position each being located at one apex of the triangle. A handle movement control template is secured to the valve body and has an opening formed through it. The faucet operating handle extends through this opening in the control template. The shape of the template openning arrows handle movement from the off position to the cold water only position and from the cold water only position to the hot water only position. However, the template precludes handle movement from the off position to a hot water only position.

DESCRIPTION OF THE DRAWING

FIG. 1 is an elevation view of a hot and cold water mixing and flow control faucet constructed in accordance with this invention, with the parts in the "off" position and having portions thereof broken away or sectioned to illustrate interior details of construction;

FIG. 2 is a view taken along the line 2—2 of FIG. 1 but showing the parts of the faucet in a hot and cold water blend "on" position;

FIG. 3 is a view taken along the line 3—3 of FIG. 2;

FIG. 4 is a view taken along the line 4—4 of FIG. 2;

FIG. 5 is a view taken along the line 5—5 of FIG. 2;

FIG. 6 is a schematic illustration of the locus of possible handle positions for the faucet of this invention, and FIG. 7 is an isometric view of the operating handle control template of the faucet of this invention including a portion of the operating handle.

DETAILED DESCRIPTION OF THE INVENTION

Referring now in detail to the drawing and in particular to FIGS. 1 and 2 thereof, the numeral 8 denotes generally a single handle water faucet constructed in accordance with this invention. The internal water mixing and valve construction and function are identical to those of the faucet disclosed in previously identified U.S. Pat. No. 3,056,418. Thus only the highlights of this internal construction will be discussed herein. If details of the internal construction of this faucet desired, reference is hereby made to said patent. The faucet includes a generally cylindrical outer shell or casing 10 that is rotatably mounted on and includes a valve main body 12. Body 12 is formed with a circumferentially extended groove or cavity 16 of substantial axial length which is flanked at its opposite ends by a pair of sealing O-rings 18 mounted in the body 12. An annular fluid passage is thus defined between the body 12 and the interior of the casing 10. Casing 10 includes an outwardly extending spout 14 through which water can pass from this annular fluid passage.

In the lower end of the body 12, a cold water inlet pipe 20 and a hot water inlet pipe 22 are received in a pair of passages 24 and 26, respectively. At their upper ends, the passages 24 and 26 communicate with terminal openings 28 and 30, respectively, which, in turn, exit into a semispherical, upwardly facing recess or ball seat formed at the top of body 12. A spring 32 within terminal opening 28 biases a tubular sealing element 34 upwardly. In like manner, a spring 33 located in terminal opening 30 acts on a sealing element 35. These sealing elements 34 and 35 are formed of rubber or other elastomeric sealing materials and are forced by the springs into intimate contact with the ball shaped valve member 40.

The ball valve member 40 is received in the spherical recess formed in the top of main body 12 and because of the force of springs 32 and 33 is sealingly engaged by elements 34 and 35. Movement of ball valve 40 is made possible by a handle denoted generally by the numeral 41 that includes a ball valve stem 42 extending upwardly from the ball valve 40 and a manually grippable handle element 44 secured to the upper end of stem 42.

An internally threaded cap member 46 is threaded to an upwardly extending flange 48 projecting from body 12. Ring 50, which will be described in detail below, is held within the inner periphery of cap 46 by a threaded annulus 52 secured to the threaded interior wall of cap 46. A sealing element 54 of elastomeric material is held in place between ring 50 and ball valve 40 and prevents leakage of water upwardly around member 40.

The ball valve 40 is formed with three radially extending passages 56, 58 and 60 having a common junction in substantially the center of the ball. The passage 60 is preferably equivalent in cross-sectional area to the combined cross-sectional areas of the passages 56 and 58. At its outer end, passage 60 communicates with a generally vertically disposed duct 62 formed in the body 12. A generally horizontally or transversely disposed blind bore or passage 64 receives fluid from the lower end of the duct 62 and communicates at its outer end with the annular space between the body 12 and the sleeve 10 for ultimate transmission of fluid to the spout 14.

By manual manipulation of the handle 41, either or both of the passageways 56 and 58 may be brought into registry with one of the water inlet passage terminals such that hot water, cold water or both may flow through passages 56, 58 and 60, duct 62, bore 64, space 16 and spout 14.

As is well known in the art and explained in detail in said U.S. Pat. No. 3,056,418, the locus of useful valve handle positions making possible the flow of varying proportions and volumes of hot and/or cold water through the faucet generally comprises a triangular patter represented by the shaded area 66 in FIG. 6 of the drawing. In actuality, the locus of possible useful handle positions is a three-sided figure having slightly arcuate sides but, for purposes of discussion and simplity, it will be assumed that this three-sided figure 66 is triangular. The "off" handle position illustrated in FIG. 1 of the drawing is represented in phantom at 68 in FIG. 6. The phantom position 70 represents the full volume, cold water only handle position while the phantom position 72 represents the full volume, hot water only handle position. It thus readily may be appreciated that if stem 42 is moved from the off position 68 along side 74 of triangle 66, only cold water will pass through the faucet with the volume of cold water becoming increasingly great as the stem position approaches the maximum cold water volume position 70. Further, if stem 42 is moved from the position 68 along triangle side 76, hot water alone will pass through the faucet until a maximum hot water volume is reached in the position 72. In handle positions along triangle wall 78, between positions 70 and 72, high volume blends of hot and cold water are achieved.

As explained above, an object of this invention is to provide a faucet design that preempts the possibility of handle movement directly from the off position to any of the hot water only positions. In furtherance of this end, ring 50 is provided with a template opening threrethrough identified by the numeral 80. Valve handle stem 42 extends through this template opening 80. The shape of opening 80 is partially defined by a projection or stop shoulder 82 formed on ring 50. Thus the opening 0 consists of a first elongate portion 84 that intersects a second elongate portion 86. The intersection of portions 84 and 86 coincides with the maximum volume, cold water only position 70 of FIG. 6. Thus, the extremity of elongate portion 84 remote from the intersection of portions 84 and 86 coincides with the off position and the extremity of opening portion 86 remote from the intersection of portions 84 and 86 coincides with the maximum volume, hot water only handle position 72 of FIG. 6.

With particular reference to FIG. 3, it may be seen that because of the configuration of opening 80, it is impossible to move the handle stem 42 from the off position (shown in phantom 90 in FIG. 3) to a position wherein hot water alone will pass through the faucet 10. From the off position, stem 42 may be moved only through a plurality of exclusively cold water positions until the stem reaches the intersection of template opening portions 84 and 86 where maximum cold water volume is obtained. From the maximum volume cold water position, stem 42 may be moved along opening portion 86 to increase the percentage of hot water and decrease the percentage of cold water passing through the faucet until the desired temperature of water exiting spout 14 is achieved. (It should be noted that in order to return stem 42 to the off position, it must pass through the maximum cold water position.)

From FIG. 3 it may seen that the width of opening portion 86 is substantially greater than the width of portion 84 and, in fact, this width is approximately twice the diameter of stem 42. Thus when stem 42 is in a hot-cold water blend position along the length of opening portion 86 as illustrated in FIGS. 2 and 3, it is possible to vary somewhat the volume of water passing through the faucet by moving the stem 42 across the width of opening portion 86 towards and away from the off position. By way of example, the phantom stem position 88 in FIG. 3 gives the same temperature water through the faucet as the cross hatched stem position 42, but at a reduced flow volume.

Adjacent the end of opening portion 86 remote from the intersection of portions 84 and 86, a projection 92 is integrally formed with ring 50 and extends upwardly. A threaded hole extends through projection 92 coaxially with the longitudinal axis of portion 86 and threadably receives a set screw 94. The position of set screw 94 may be varied to adjust the maximum distance stem 42 can be moved along opening portion 86 toward the maximum volume hot water position. Thus, if faucet 8 is in communication with a hot water source delivering water at an extremely high temperature, set screw 94 may be adjusted to extend a relatively great distance to the right as viewed in FIGS. 2 and 3 to limit the temperature of water delivered by faucet 8. If desired, however, set screw 94 may be retracted to allow full movement of stem 42 along opening portion 86 to obtain higher hot water temperatures.

It thus may be seen that this invention provides a single handle faucet that is incapable of being varied directly from an off condition to a condition wherein only hot water is supplied. The operating handle of the faucet of this invention can be moved from the off position to an exclusively hot water position only by first passing through a high volume, exclusively cold water position. Also, the single handle faucet of this invention is adjustable to limit the maximum percentage of hot water in the total water flow to compensate for variances in the temperature of hot water supplied from different hot water sources.

What is claimed is:

1. A single handle hot and cold water mixing and flow control faucet comprising: a valve body connectable to a source of cold water and a source of hot water, said valve body having an outlet duct formed therein, valve means within said valve body selectively movable to interconnect said sources and said duct such that varying volumes and proportions of cold and hot water are directed to said duct and to isolate said sources from said duct, an elongate manually operable handle extending from said valve body and connected to said valve means for movement of said means, a given point on said handle being movable among a first position wherein said sources are isolated from said duct, a second position wherein only cold water is directed to said duct and a third position wherein only hot water is directed to said duct, said first and second positions being interconnected by an imaginary first line, said second and third positions being interconnected by an imaginary second line and said third and first positions being interconnected by an imaginary third line, said first, second and third lines forming a triangle, and a handle guide member fixedly secured to said valve body and having an opening therein through which said handle extends such that the limits of handle movement are defined by the shape of said opening, said opening comprising only an elongate first position portion extending parallel to said first line and elongate second portion extending parallel to said second line and intersecting said first line, such that movement of said given point along said third line is prohibited.

2. The faucet of claim 1, wherein the cross sectional dimensions of said handle at the point where said handle passes through said handle guide member are less than the width of said opening second position, whereby said handle may be moved in said second portion such that said given point moves parallel to said third axis.

3. The faucet of claim 1, including adjustable stop means on said guide member positioned at the end of said opening second portion remote from said first portion and limiting movement of said handle toward said third position.

4. A single handle hot and cold water mixing and flow control faucet adapted to interconnect sources of hot and cold water and outlet means; said faucet including a manually movable operating handle movable in a valve body among an infinity of positions including an off position, a hot water only position and a cold water only position to vary the proportions and volumes of hot and cold water passing through the faucet, the locus of possible handle positions being generally triangular with the off position, hot water only position and cold water only position each being located at one apex of the triangle, and a handle movement control template secured to said valve body and having an opening therethrough through which said handle extends, the shape of said template opening being such as to allow handle movement from the off position to the cold water only position and from the cold water only position to the hot water only position, said template precluding handle movement from the off position to the hot water only position.

* * * * *

UNITED STATES PATENT OFFICE
CERTIFICATE OF CORRECTION

Patent No. 3,915,195            Dated October 28, 1975

Inventor(s) Alex Manoogian et al

It is certified that error appears in the above-identified patent and that said Letters Patent are hereby corrected as shown below:

Column 2, lines 34 and 35, delete "patter and substitute -- pattern --.

Column 5, line 26, delete "position".

Signed and Sealed this ninth Day of March 1976

[SEAL]

Attest:

RUTH C. MASON
*Attesting Officer*

C. MARSHALL DANN
*Commissioner of Patents and Trademarks*